Patented Mar. 12, 1940

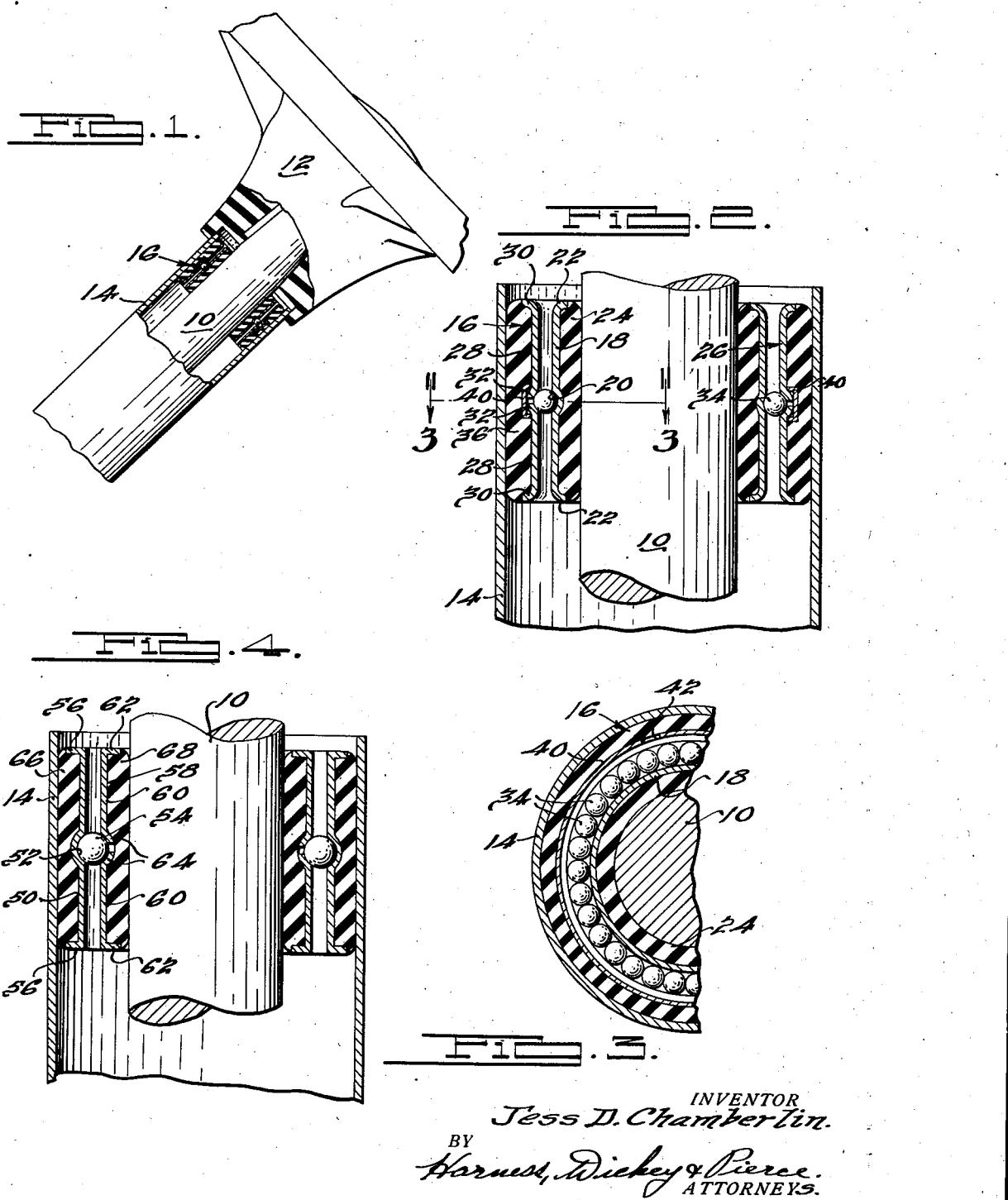

2,193,549

UNITED STATES PATENT OFFICE 2,193,549

STEERING COLUMN BUSHING

Jess D. Chamberlin, Detroit, Mich.

Application July 5, 1938, Serial No. 217,439

9 Claims. (Cl. 308—26)

This invention relates to bushings and particularly to the type thereof suitable for use between the steering shaft and the steering column or mast jacket of steering gears of motor vehicles, the principal object being the provision of a bushing of this type that is simple in construction, efficient in operation and economical to produce.

Other objects of the invention include the provision of a bushing or bearing including rolling anti-friction members so constructed and arranged as to readily yield to accommodate slight variations in the alignment of the parts connected thereby; the provision of a bushing of the type described in which one of the race members is formed in two parts separated from one another centrally of the raceway thereof and provided with coacting yieldable means surrounding the same; and the provision of a bushing or bearing including a cylindrical member having a raceway formed therein and a pair of cylindrical members arranged in telescoping relation with respect thereto and formed to provide a raceway in opposed relation to the first mentioned raceway between their adjacent ends.

Other objects of the invention include the provision of a bushing or bearing including inner and outer raceway forming members, the inner of which is provided with a layer of yieldable material overlying the same; the provision of a bearing or bushing of the type described including a general cylindrical shell-like member providing a raceway therein and a pair of generally cylindrical shell-like members arranged in telescoping relation with respect thereto and formed to provide between them a second raceway in opposed relation to the first mentioned raceway, anti-friction elements being interposed between said raceways, and the second mentioned cylindrical members being provided with an overlying covering serving to maintain them in desired assembled relation; the provision of a bushing or bearing including inner and outer raceway forming members and rolling anti-friction elements therebetween, a layer of rubber overlying the inner face of the inner raceway forming member and a layer of rubber overying the outer face of the outer raceway forming members; the provision of a bushing or bearing of the type described in which one of the race forming members is split axially thereof centrally of one of the raceways thereof and provided with a rubber coating adapted to be compressed when inserted in position and thereby frictionally maintain the desired axial position of the bushing and the relation of the split portions of said split member; and the provision of a bushing or bearing of the type described in which means are provided for positively limiting separating movement between the axially separated raceway forming members.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a fragmentary, partially broken, partially sectioned side elevational view of the upper end of a motor vehicle steering gear illustrating a bushing constructed in accordance with the present invention interposed between the steering shaft and steering column or mast jacket thereof, the bushing being shown in section taken in a plane passing through the axis thereof;

Fig. 2 is an enlarged fragmentary sectional view of that portion of the steering gear shown in Fig. 1 including the bushing thereof and also illustrating the bushing in section taken in a plane passing axially therethrough;

Fig. 3 is a fragmentary transverse sectional view taken on the line 3—3 of Fig. 2;

Fig. 4 is a view similar to Fig. 2 but illustrating a slightly modified form of construction.

Referring to the drawing, the numeral 10 indicates the usual steering shaft of a steering gear of a motor vehicle having rigidly secured thereto at its upper end in any suitable or conventional manner a steering wheel 12. Below the steering wheel 12 the shaft 10 is surrounded by a steering column or mast jacket 14 arranged in concentric and radially spaced relation with respect thereto. Between the upper end of the mast jacket 14 and the shaft 10 is arranged what is conventionally known as a steering column bushing indicated generally at 16 and shown in greater detail in Figs. 2 and 3.

Referring now to Figs. 2 and 3 it will be noted that the bushing 16 includes an inner generally cylindrical sleeve member or portion 18 formed from sheet metal, thin walled tubing or the like and intermediate its ends formed to provide a radially inwardly directed annular groove 20 forming a raceway. The opposite axial end portions of the sleeve 18 are turned or flanged radially inwardly as at 22, preferably, but not necessarily, in a circumferentially continuous manner.

The sleeve 18 is located upon the shaft 10 and maintained in substantially concentric and generally radially spaced relation with respect to the outer surface thereof by means of an annular ring 24 of yieldable and/or resilient material interposed therebetween.

Positioned in concentric relation with respect to the sleeve 18 and in generally radially spaced and telescoping relation with respect thereto is a sleeve assembly or portion indicated generally at 26 and including a pair of identical sleeve members 28 each of which is provided with a radially outwardly turned flange 30, preferably but not necessarily circumferentially continuous, at one end thereof and a radially outwardly offset annular portion 32 at the opposite end thereof, the portions 32 being arranged in opposed and adjacent relationship and forming between them on their radially inner sides a second raceway located in opposed relationship with respect to the raceway 20. A plurality of ball bearings 34 are interposed between these two raceways and are adapted to have rolling contact with both thereof. The assembly 26 is located axially of and spaced radially inwardly of the inner walls of the mast jacket 14 by means of a relatively thick annular ring 36 of material interposed therebetween.

In the broader aspects of the invention the rings 24 and 36 may be formed of any suitable yieldable or resilient material which for instance may be felt, certain types of fabrics, rubber, or compositions of rubber and fabric, and the outer ring 36 in particular may even be of rigid or semirigid non-metallic material of any desired type but in such case will usually be split diametrically thereof for the purpose of ease in assembly, but preferably these rings are formed of rubber of a suitable easily deformed character. The internal diameter of the ring 24, when formed of readily yieldable material such as rubber, felt, or the like, in its free state is smaller than the external diameter of the shaft 10 so that when the bushing is applied to the shaft 10 it requires radial compression of the ring 24 in order to pass it down over the shaft 10. Likewise where the ring 36 is formed of readily yieldable material such as rubber, felt or the like, its external diameter in its free state is greater than the internal diameter of the mast jacket 14 so that forcing it within the mast jacket 14 requires radial compression of the ring 36. Ordinarily the amount of compression required to force the bushing 16 onto the shaft 10 and through the upper end of the mast jacket 14 creates a sufficient amount of friction between the rings 24 and 36 and the cooperating shaft 10 and mast jacket 14, respectively, to eliminate the necessity of providing any positive stop or limiting the axial position of the bushing 16 in the mast jacket 14.

Because of the fact that the sleeve assembly 28 is formed in two axially separated parts which are separated centrally of the outer raceways for the ball bearings 34, it is possible to form the inner raceway as an integral part and yet readily assemble the balls 34 in place. The outer ring 36, when formed of readily yieldable material such as felt, rubber or the like is preferably of slightly smaller internal diameter than the external diameter of the sleeve 28 so as to grip the sleeves and frictionally hold them against axial separation. This is particularly true where the outer ring 36 is formed of rubber and is not vulcanized to the sleeves 28, although vulcanization may be resorted to in such case if desired.

Where the outer ring 36 is not made of rubber or other yieldable or resilient material it will be necessary usually to split it in a plane passing through its axis so as to form it in two halves readily assemblable about the sleeve 28. In any case the inwardly offset ends 32 in engaging in the complementary groove formed in the inner wall of the ring 36 will prevent axial separation of the sleeves 28.

Where the ring 36 is made of yieldable or resilient material, it may be desirable in some instances, in order to prevent compression of the same from forcing in between the adjacent ends of the sleeve 28 and thereby endangering looseness of the bearing, to provide means for protecting the joint between the sleeves 28. One method of accomplishing this result is illustrated in Figs. 2 and 3 as comprising an annular ring 40 preferably of channel section as shown with the channel opening radially inwardly and receiving the outwardly offset portions therebetween. The ring 40 is preferably split, as indicated at 42 in Fig. 3 so as to render it readily applicable to and removable from the assembly. The ring 40 is of further advantage in that it serves as a means for positively maintaining the sleeves 28 against axial separation.

It will be appreciated that the inner sleeve 18 and outer sleeves 28 may be readily formed of sheet metal or from thin walled tubing and may be case-hardened or otherwise suitably hardened before assembly, either in whole or over only those areas forming the raceway for the balls 34, so as to insure the desired long life to the bushing.

The modified construction shown in Fig. 4 is essentially similar to that illustrated in Fig. 2 except for the fact that the outer sleeve member is integral in this case and the inner sleeve member is split axially of the bearing race. In other words the outer sleeve member 50, which corresponds with the sleeve assembly 26 in the first described construction, comprises a generally cylindrical sleeve member provided with an internal annular groove or depression 52 midway between its ends forming the outer race for the ball bearings 54 and its opposite axial end portions are radially outwardly flanged.

The modified construction shown in Fig. 4 is essentially similar to that illustrated in Fig. 2 except for the fact that the outer sleeve member 50 is integral in this case and the inner sleeve member is split axially of the bearing race. In other words the outer sleeve member 50, which corresponds with the sleeve assembly 26 in the first described construction, comprises a generally cylindrical sleeve member provided with an internal annular groove or depression 52 midway between its ends forming the outer race for the ball bearings 54 and its opposite axial end portions are radially outwardly flanged as at 56, corresponding to the flanges 30 in the previously described construction except that in this case the flanges are sharply turned from the main body portion instead of being rounded as in the first described construction. The inner sleeve assembly indicated generally at 58 in this case comprises two identical generally cylindrical sleeves 60 each provided with a radially inwardly turned flange 62 at one end and a radially inwardly offset portion 64 at the opposite end, the portions 64 being arranged in opposed relationship so as to form the inner race for the ball bearings 54 between such offset ends. Inner and outer annular layers 66 and 68 are provided in surrounding relationship with respect to the outer sleeve 50 and in enclosed relationship with respect to the inner sleeve assembly 58, respectively, in the same general manner as the first described construction and these layers 66 and 68 may be formed from the same material as described for the layers 36 and 24 respectively of the first described construction. As will be apparent the operation of the modification shown in Fig. 4 will be substantially identical to that described in connection with Fig. 2.

Formal changes may be made in the specific embodiments of the invention described without departing from the spirit or substance of the broad invention, the scope of which is commensurate with the appended claims.

What I claim is:

1. A bearing structure comprising, in combination, an integral annular sleeve member having a ball race formed intermediate the ends thereof, a pair of annular sleeve members arranged in telescoping relation with respect to the first mentioned sleeve member, the adjacent ends of said pair of sleeve members cooperating to provide a second ball race in opposed relation to the first mentioned ball race, a plurality of balls received between said races, an annular ring of yieldable non-metallic material embraced within the inner of said members, and an annular ring of yieldable non-metallic material surrounding the outer of said members.

2. A bearing structure comprising, in combination, an integral annular sleeve member having a ball race formed intermediate the ends thereof, a pair of annular sleeve members arranged in telescoping relation with respect to the first mentioned sleeve member, the adjacent ends of said pair of sleeve members being formed to provide a second ball race in opposed relation to the first mentioned ball race, a plurality of balls received between said races, a ring of rubber embraced within the inner of said members and a sleeve of yieldable non-metallic material surrounding the outer of said members.

3. A bearing structure comprising, in combination, an integral annular sleeve member having a ball race formed intermediate the ends thereof, a pair of annular sleeve members arranged in telescoping relation with respect to the first mentioned sleeve member, the adjacent ends of said pair of sleeve members being formed to provide a second ball race in opposed relation to the first mentioned ball race, a plurality of balls received between said races, a ring of rubber embraced within the inner of said members and a ring of rubber surrounding the outer of said members.

4. A bearing assembly comprising in combination, a generally cylindrical sleeve having an annular radial groove formed intermediate its ends to provide a raceway, a pair of generally cylindrical sleeves arranged in end to end relationship and in telescoping relation with respect to the first mentioned sleeve, the adjacent ends of said pair of sleeves being offset to form between them a raceway in opposed relation with respect to the first mentioned raceway, a plurality of anti-friction elements received between said raceways, radially directed flanges at the opposite end of the first mentioned sleeve, a radially directed flange at the outer end of each of said pair of sleeves, the flanges of said pair of sleeves and the flanges of the first mentioned sleeve extending in opposite directions, an annular layer of non-metallic material received between the flanges of the first mentioned sleeve, and a second annular layer of non-metallic material received between the flanges of said pair of sleeves.

5. A bearing assembly comprising in combination, a generally cylindrical sleeve having an annular radial groove formed intermediate its ends to provide a raceway, a pair of generally cylindrical sleeves arranged in end to end relationship and in telescoping relation with respect to the first mentioned sleeve, the adjacent ends of said pair of sleeves being offset to form between them a raceway in opposed relation with respect to the first mentioned raceway, a plurality of anti-friction elements received between said raceways, radially directed flanges at the opposite end of the first mentioned sleeve, a radially directed flange at the outer end of each of said pair of sleeves, the flanges of said pair of sleeves and the flanges of the first mentioned sleeve extending in opposite directions, an annular layer of rubber received between the flanges of the first mentioned sleeve, and a second annular layer of rubber received between the flanges of said pair of sleeves.

6. A bearing assembly comprising in combination, an annular sleeve member having an annular groove formed intermediate its ends, a pair of sleeve members arranged in end to end relationship and telescoping relationship with respect to the first mentioned sleeve member and generally spaced therefrom, the adjacent ends of said pair of sleeve members being radially offset to form a raceway between them in opposed relationship with respect to the first mentioned raceway, a plurality of rolling anti-friction elements received between said raceways, and means embracing said radially offset portions whereby to limit axial separation of said pair of sleeve members.

7. A bearing assembly comprising in combination, an annular sleeve member having an annular groove formed intermediate its ends, a pair of sleeve members arranged in end to end relationship and telescoping relationship with respect to the first mentioned sleeve member and generally spaced therefrom, the adjacent ends of said pair of sleeve members being radially offset to form a raceway between them in opposed relationship with respect to the first mentioned raceway, a plurality of rolling anti-friction elements received between said raceways, and a ring member embracing said radially offset portions whereby to limit axial separation of said pair of sleeve members.

8. A bearing assembly comprising in combination, an annular sleeve member having an annular groove formed intermediate its ends, a pair of sleeve members arranged in end to end relationship and telescoping relationship with respect to the first mentioned sleeve member and generally spaced therefrom, the adjacent ends of said pair of sleeve members being radially offset to form a raceway between them in opposed relationship with respect to the first mentioned raceway, a plurality of rolling anti-friction elements received between said raceways, and a ring member having axially spaced radial flanges embracing said radially offset portions whereby to limit axial separation of said pair of sleeve members.

9. A bearing assembly comprising in combination, an annular sleeve member having an annular groove formed intermediate its ends, a pair of sleeve members arranged in end to end relationship and telescoping relationship with respect to the first mentioned sleeve member and generally spaced therefrom, the adjacent ends of said pair of sleeve members being radially offset to form a raceway between them in opposed relationship with respect to the first mentioned raceway, a plurality of rolling anti-friction elements received between said raceways, a ring member having axially spaced radial flanges embracing said radially offset portions whereby to limit axial separation of said pair of sleeve members, and an annular layer of non-metallic material arranged in embracing relationship with respect to said pair of sleeve members and said ring member.

JESS D. CHAMBERLIN.